US008205025B2

(12) United States Patent
Flatland et al.

(10) Patent No.: US 8,205,025 B2
(45) Date of Patent: Jun. 19, 2012

(54) EFFICIENT BUFFERED READING WITH A PLUG-IN FOR INPUT BUFFER SIZE DETERMINATION

(75) Inventors: Steinar Flatland, Clifton Park, NY (US); Mark Richard Gaulin, Albany, NY (US)

(73) Assignee: GlobalSpec, Inc., East Greenbush, NY (US)

( * ) Notice: Subject to any disclaimer, the term of this patent is extended or adjusted under 35 U.S.C. 154(b) by 41 days.

(21) Appl. No.: 12/854,755

(22) Filed: Aug. 11, 2010

(65) Prior Publication Data

US 2011/0040905 A1    Feb. 17, 2011

Related U.S. Application Data

(60) Provisional application No. 61/233,411, filed on Aug. 12, 2009, provisional application No. 61/233,420, filed on Aug. 12, 2009, provisional application No. 61/233,427, filed on Aug. 12, 2009.

(51) Int. Cl.
  G06F 3/00      (2006.01)
  G06F 13/00    (2006.01)

(52) U.S. Cl. .......................................... 710/52; 710/310

(58) Field of Classification Search ............... 710/22–24, 710/52–57, 310
See application file for complete search history.

(56) References Cited

U.S. PATENT DOCUMENTS

| | | | |
|---|---|---|---|
| 3,987,419 A | 10/1976 | Morrill et al. ............... 340/172.5 |
| 4,158,235 A | 6/1979 | Call et al. ...................... 364/900 |
| 4,754,399 A * | 6/1988 | Yamamoto et al. ............. 710/57 |
| 5,179,662 A | 1/1993 | Corrigan et al. ............... 395/250 |
| 5,263,159 A | 11/1993 | Mitsui et al. ................... 395/600 |
| 5,373,512 A * | 12/1994 | Brady ............................ 714/767 |
| 5,537,552 A * | 7/1996 | Ogasawara et al. ............. 710/57 |
| 5,784,698 A | 7/1998 | Brady et al. ................... 711/171 |
| 5,905,911 A * | 5/1999 | Shimizu .......................... 710/22 |
| 5,915,249 A | 6/1999 | Spencer ............................ 707/5 |
| 5,916,309 A | 6/1999 | Brown et al. .................... 710/52 |
| 6,067,547 A | 5/2000 | Douceur ........................ 707/100 |
| 6,067,584 A | 5/2000 | Hayles et al. ................... 710/10 |
| 6,161,154 A | 12/2000 | Schultz et al. .................. 710/56 |
| 6,349,308 B1 | 2/2002 | Whang et al. ................. 707/107 |
| 6,439,783 B1 | 8/2002 | Antoshenkov ................ 395/603 |
| 6,463,486 B1 | 10/2002 | Parry et al. ..................... 710/52 |
| 6,542,967 B1 | 4/2003 | Major ............................ 711/134 |
| 6,546,456 B1 | 4/2003 | Smith et al. ................... 711/112 |
| 6,993,604 B2 | 1/2006 | Dixon ............................. 710/56 |
| 7,058,642 B2 | 6/2006 | Kurupati et al. .............. 707/101 |
| 7,099,898 B1 | 8/2006 | Nakamura et al. ............ 707/203 |
| 7,143,263 B2 | 11/2006 | Anand et al. .................. 711/171 |

(Continued)

OTHER PUBLICATIONS

Torresani, et al., "Learning Query-dependent Prefilters for Scalable Image Retrieval," IEEE, Jun. 23, 2009, 8 pages.

(Continued)

*Primary Examiner* — Christopher Shin
(74) *Attorney, Agent, or Firm* — Wayne F. Reinke, Esq.; Heslin Rothenberg Farley & Mesiti P.C.

(57) ABSTRACT

A method of buffered reading of data is provided. A read request for data is received by a buffered reader, and in response to the read request, a main memory input buffer is partially filled with the data by the buffered reader to a predetermined amount that is less than a fill capacity of the input buffer. Corresponding computer system and program products are also provided.

39 Claims, 5 Drawing Sheets

U.S. PATENT DOCUMENTS

| | | | |
|---|---|---|---|
| 7,146,466 B2 | 12/2006 | Craft et al. | 711/133 |
| 7,213,094 B2 | 5/2007 | Edirisoori et al. | 710/310 |
| 7,260,692 B1* | 8/2007 | Zahavi et al. | 711/154 |
| 7,266,622 B2 | 9/2007 | Flanigan et al. | 710/56 |
| 7,330,916 B1 | 2/2008 | Kirk | 710/52 |
| 7,337,165 B2 | 2/2008 | Baader et al. | 707/3 |
| 7,370,037 B2 | 5/2008 | Doerre et al. | 707/3 |
| 7,480,750 B2 | 1/2009 | Shimizu | 710/56 |
| 7,487,141 B1 | 2/2009 | Stephan | 707/3 |
| 7,487,178 B2 | 2/2009 | Hsu et al. | 707/104.1 |
| 7,490,185 B2* | 2/2009 | Morishima et al. | 710/113 |
| 7,533,245 B2 | 5/2009 | Frieder et al. | 712/32 |
| 7,536,408 B2 | 5/2009 | Patterson | 707/102 |
| 7,698,475 B2* | 4/2010 | Sawai et al. | 710/22 |
| 2003/0069877 A1 | 4/2003 | Grefenstette et al. | 707/2 |
| 2003/0177292 A1* | 9/2003 | Smirnov et al. | 710/30 |
| 2005/0132101 A1* | 6/2005 | McEvilly et al. | 710/36 |
| 2005/0246457 A1 | 11/2005 | Parry et al. | 710/53 |
| 2006/0080482 A1 | 4/2006 | Dixon | 710/52 |
| 2006/0248037 A1 | 11/2006 | Meyer et al. | 707/1 |
| 2007/0078890 A1 | 4/2007 | Hsu et al. | 707/103 R |
| 2007/0112813 A1 | 5/2007 | Beyer et al. | 707/101 |
| 2007/0156958 A1 | 7/2007 | Misra | 711/114 |
| 2007/0198754 A1* | 8/2007 | Hill et al. | 710/34 |
| 2007/0255698 A1 | 11/2007 | Kaminaga et al. | 707/3 |
| 2008/0040307 A1 | 2/2008 | Loofbourrow | 707/1 |
| 2008/0059420 A1 | 3/2008 | Hsu et al. | 707/3 |
| 2008/0140639 A1 | 6/2008 | Doerre et al. | 707/4 |
| 2008/0228743 A1 | 9/2008 | Kusnitz et al. | 707/4 |
| 2009/0049086 A1 | 2/2009 | Hsu et al. | 707/103 R |
| 2009/0094416 A1 | 4/2009 | Baeza-Yates et al. | 711/118 |
| 2009/0112843 A1 | 4/2009 | Hsu et al. | 707/5 |
| 2009/0132521 A1 | 5/2009 | Walters et al. | 707/5 |
| 2009/0164424 A1 | 6/2009 | Sznajder et al. | 707/3 |
| 2009/0164437 A1 | 6/2009 | Torbjornsen | 707/3 |

OTHER PUBLICATIONS

Wang, et al., "Efficient Approximate Entity Extraction with Edit Distance Constraints," SIGMOD '09, Jun. 29-Jul. 2, 2009, Providence, Rhode Island, USA, 12 pages.

Anh, V.N. and Moffat, A., "Pruned Query Evaluation Using Pre-Computed Impacts," In Proceedings 29$^{th}$ Annual International ACM SIGIR Conference (SIGIR 2006), Seattle, Washington, pp. 372-379.

Buettcher, Stefan, "The Wumpus Information Retrieval System—On-disk index data structures," http://www.wumpus-search.org/documents/ondisk_index.html, Jun. 30, 2009, 2 pages.

Fontoura, et al., "Inverted Index Support for Numeric Search," Sep. 12, 2005, 22 pages.

* cited by examiner

EFFICIENT BUFFERED READING WITH A PLUG-IN FOR INPUT BUFFER SIZE DETERMINATION

CROSS-REFERENCE TO RELATED APPLICATIONS

This application claims priority under 35 U.S.C. §119 to the following U.S. Provisional Applications, which are herein incorporated by reference in their entirety:

Provisional Patent Application No. 61/233,420, by Flatland et al., entitled "EFFICIENT BUFFERED READING WITH A PLUG IN FOR INPUT BUFFER SIZE DETERMINATION," filed on Aug. 12, 2009;

Provisional Patent Application Ser. No. 61/233,411, by Flatland et al., entitled "ESTIMATION OF POSTINGS LIST LENGTH IN A SEARCH SYSTEM USING AN APPROXIMATION TABLE," filed on Aug. 12, 2009; and Provisional Patent Application Ser. No. 61/233,427, by Flatland et al., entitled "SEGMENTING POSTINGS LIST READER," filed on Aug. 12, 2009.

This application contains subject matter which is related to the subject matter of the following applications, each of which is assigned to the same assignee as this application and filed on the same day as this application. Each of the below listed applications is hereby incorporated herein by reference in its entirety:

U.S. Non-Provisional patent application Ser. No. 12/854,726, by Flatland et al., entitled "ESTIMATION OF POSTINGS LIST LENGTH IN A SEARCH SYSTEM USING AN APPROXIMATION TABLE"; and U.S. Non-Provisional patent application Ser. No. 12/854,775, by Flatland et al., entitled "SEGMENTING POSTINGS LIST READER".

BACKGROUND OF THE INVENTION

1. Technical Field

The present invention generally relates to buffered reading of data. More particularly, the invention relates to improving runtime performance by automatically obtaining a predetermined value for an amount of data to place in a memory buffer. In this way, the buffer is filled only to an extent needed based on anticipated read requests, instead of automatically fully filling the buffer.

2. Background Information

Figure 1:
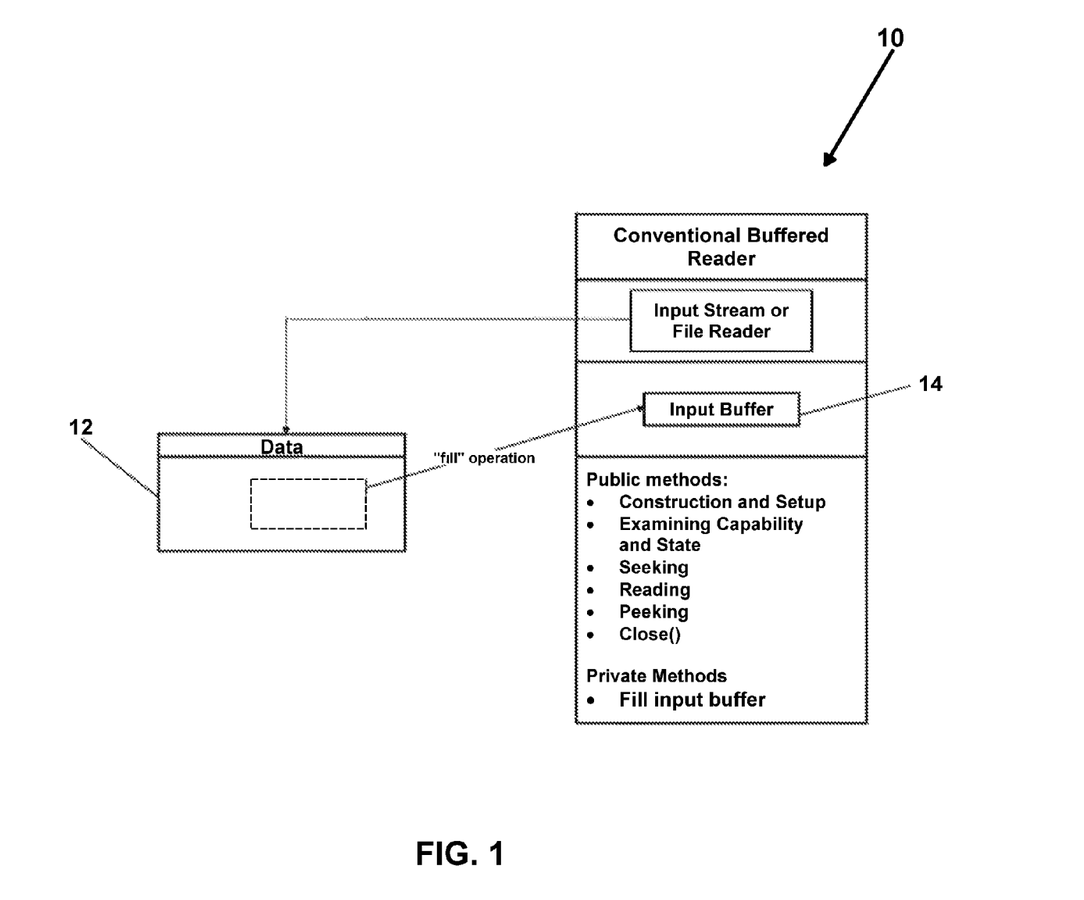
FIG. 1 depicts a conventional buffered reader.

The conventional buffered reader 10, shown in FIG. 1, is a recurring abstraction implemented as part of the standard library of numerous modern object-oriented programming languages. Table 1 shows examples of the fully qualified class names of the conventional buffered reader in various programming languages:

TABLE 1

Fully Qualified Buffered Reader Class Names in Various Programming Languages

| Language | Conventional Buffered Reader Class Name |
| --- | --- |
| Python | io.BufferedReader |
| C++ | iostream library, class filebuf |
| C# | System.IO.BufferedStream |
| Java | (1) java.io.BufferedReader |
|  | (2) java.io.BufferedInputStream |

In this document, the term buffered reader refers to a general object-oriented pattern, of which the implementations listed in Table 1 are examples. A buffered reader, as its name suggests, provides buffered reading of an underlying data source 12. See FIG. 1. The data source may be a physical device like secondary storage (file on disk), a network card, random access memory, or any other data access device that can be interfaced with an operating system.

In buffered reading, the buffered reader fills a fixed size main memory input buffer to hold the data needed to satisfy client read requests. The data type of the input buffer is usually (but not necessarily) array of character or array of byte. An element of the input buffer array is referred to hereafter as an input buffer element.

Each input buffer fill operation is typically accomplished through a single operating system (OS) read system call. Depending upon the specific underlying data source, a read system call can be relatively costly in terms of runtime performance. Fortunately, once the main memory input buffer is filled, read requests made by the application are satisfied rapidly.

A disadvantage of conventional buffered reading is that the buffered reader does not know how much data the client application will need to read when the buffered reader fills its internal buffer. This results in some wasted data transfer from the operating system to the buffered reader.

Buffered reading provides a nice separation between the number of read requests issued by an application and the number of OS read system calls that are required. If the application makes numerous small read requests, as would be required to deserialize an object consisting of numerous small attributes, for example, the read requests can usually be satisfied from the input buffer 14 with only occasional read system calls to refill the buffer.

Buffered readers typically expose through their public interface the concept of the current logical position, or just current position. This is the current logical offset within the data being read, conceptualizing the source data as an array of the input buffer element type. The current logical position tends to lag the current physical position within the data being read, as the buffered reader reads ahead to fill its buffer. A buffered reader automatically maintains the current logical and physical positions and refills its main memory input buffer as necessary to satisfy client requests.

A survey of the common kinds of methods found on the buffered reader classes mentioned in Table 1 above follows.

Construction and Setup

Typically, the constructor takes a file, input stream, or file reader object and an optional buffer size. If a buffer size is not provided, then a default is typically assumed. In C++, for example, the filebuf has a parameterless constructor; however, there are setter methods for setting the name of the file to open and installing the buffer to use.

Examining Capability and State

There are numerous methods for examining a buffered reader's capability and state. Some of the more common methods of this type answer the following questions: Is reading supported? Is seeking supported? Is there data available to read? How much? There is considerable variability that we will not cover here, as these details are immaterial for describing the present invention.

Seeking

Seeking is used to change the buffered reader's current position to begin reading at an offset relative to the current position, start of data, or end of data. Seeking lets the user move forwards or backwards in the data, providing random access.

Skipping is a restricted form of seeking, where the user can fast forward through the data by a specified distance.

In some implementations, both skipping and seeking are supported. In other implementations, only one or the other is supported. Seeking or skipping a distance greater than what is covered by the input buffer will invalidate the input buffer, and the buffer will be refilled when reading resumes at the new location.

Reading

Read methods are used to copy data from the buffered reader to the application that is using it. Read methods advance the current position. There is a great variety of read methods that return everything from a single byte to sequences of bytes to numerous kinds of strong types. Read methods may be strongly typed, doing type conversions from data in the input buffer.

Some conventional buffered reader implementations support a read method that copies data from the buffered reader directly into a buffer provided by the client application. With a large client-supplied buffer, such a read method allows a client to make a large read request. In fact, the read request may be much larger than the buffered reader's own internal buffer. In this case, an efficient buffered reader implementation will bypass its internal buffering mechanism and issue a large read system call that writes directly into the client's buffer. Disadvantages of this approach, from an object-oriented point of view, relate to broken encapsulation of both buffering and of access to the underlying data. To use this type of read method, the client application must allocate and manage its own buffer rather than encapsulating buffering within the buffered reader. And once the client's buffer is filled, the client is responsible for handling any deserialization required to structure the data in its buffer, rather than encapsulating deserialization as part of a strongly typed getter interface on the buffered reader itself. Some implementations also support an "unget" method for putting data back and rewinding the current position if the application has read too far.

Peeking

Peek methods, like read methods, return data to the application but they do not advance the current position.

Close

A buffered reader typically has a close( )method to close the underlying input stream or file reader by which the buffered reader acquires the data to fill its input buffer.

Other

Some buffered reader implementations provide methods that truncate the data or rewrite the data. This invention focuses on reading, so these methods are not important for this discussion.

SUMMARY OF THE INVENTION

The present application distinguishes between conventional and enhanced buffered readers. The Background Information section described conventional buffered readers. The present invention, referred to as an enhanced buffered reader, is described in the detailed description as a conventional buffered reader plus enhancements. The present application does not explicitly qualify every mention of buffered reader as conventional or enhanced if the kind of buffered reader is evident from the context.

The present invention provides, in a first aspect, a method of buffered reading of data. The method comprises receiving a read request from a requestor for data by a buffered reader within a data processing system, and in response to the read request, obtaining a predetermined value for an amount of the data to be read and placed in a memory buffer. The method further comprises reading by the buffered reader the amount of the data indicated by the predetermined value, placing by the buffered reader the data read into the memory buffer, and returning the data placed in the memory buffer to the requestor, wherein the read request is for a posting list when searching an inverted index for a search term, and wherein the posting list is associated with the search term.

The present invention provides, in a second aspect, a computer system for buffered reading of data. The computer system comprises a memory, and a processor in communication with the memory to perform a method. The method comprises receiving a read request from a requestor for data by a buffered reader, and in response to the read request, obtaining a predetermined value for an amount of the data to be read and placed in a memory buffer. The method further comprises reading by the buffered reader the amount of the data indicated by the predetermined value, placing by the buffered reader the data read into the memory buffer, and returning the data placed in the memory buffer to the requestor, wherein the read request is for a posting list when searching an inverted index for a search term, and wherein the posting list is associated with the search term.

The present invention provides, in a third aspect, a program product for buffered reading of data. The program product comprises a storage physical medium readable by a processor and storing instructions for execution by the processor for performing a method. The method comprises receiving a read request from a requestor for data by a buffered reader, and in response to the read request, obtaining a predetermined value for an amount of the data to be read and placed in a memory buffer. The method further comprises reading by the buffered reader the amount of the data indicated by the predetermined value, placing by the buffered reader the data read into the memory buffer, and returning the data placed in the memory buffer to the requestor, wherein the read request is for a posting list when searching an inverted index for a search term, and wherein the posting list is associated with the search term.

These, and other objects, features and advantages of this invention will become apparent from the following detailed description of the various aspects of the invention taken in conjunction with the accompanying drawings.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 2:
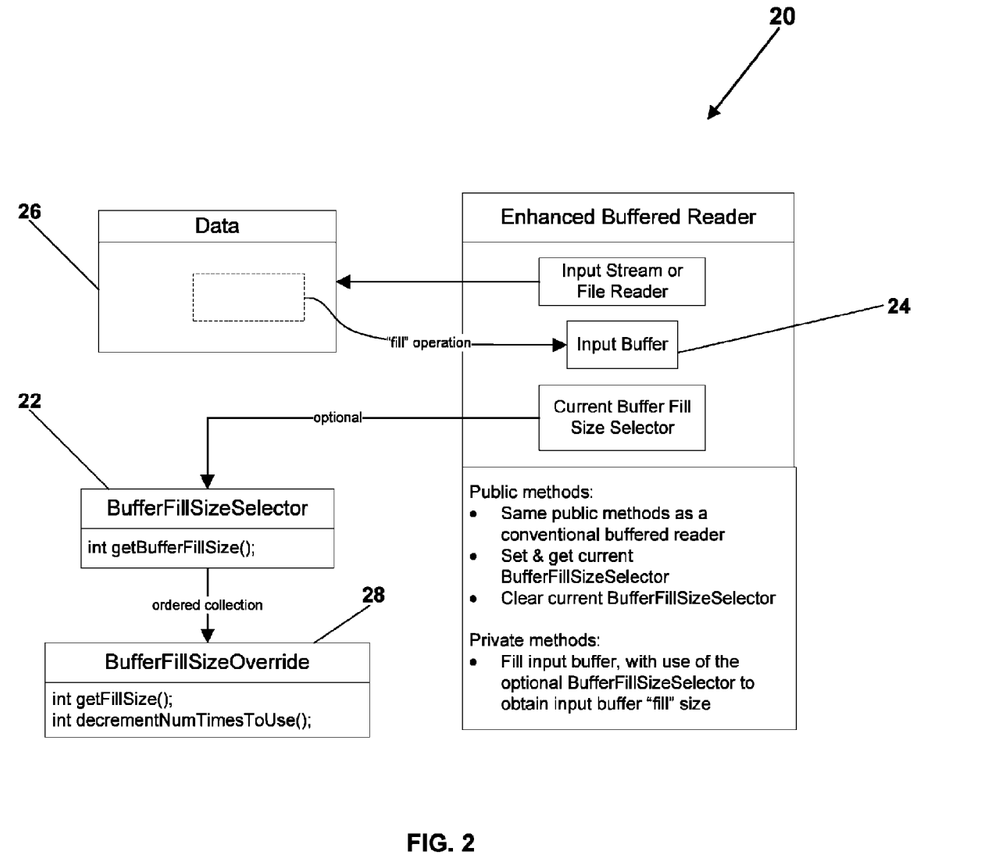
FIG. 2 depicts an example of an enhanced buffered reader, in accordance with aspects of the present invention.

The enhanced buffered reader 20 shown in FIG. 2 presents a public interface with a few additional public methods and behaviors described below, as compared to a conventional buffered reader.

Internally, an enhanced buffered reader has an optional reference to an object of class BufferFillSizeSelector 22. The BufferFillSizeSelector, when present, provides logic used by the buffered reader to determine how much of the input buffer 24 to fill when a buffer fill is needed.

When an enhanced buffered reader has no associated BufferFillSizeSelector, the enhanced buffered reader works the same way as a conventional buffered reader that generally fills its entire input buffer from the underlying device when data is needed to satisfy a read request. (Of course, exceptions to this general behavior occur at limit cases near end of data.)

The association between the enhanced buffered reader and the BufferFillSizeSelector is established either by passing a reference to BufferFillSizeSelector to the buffered reader's constructor or by calling a setter on the buffered reader. As one skilled in the art will know, a setter in object-oriented programming is a method of an object used to mutate one of the object's state variables.

Since the BufferFillSizeSelector is optional, the enhanced buffered reader provides a clear method for disassociating the BufferFillSizeSelector from the buffered reader.

The enhanced buffered reader automatically disassociates itself from its BufferFillSizeSelector when the BufferFillSizeSelector reports that it has no more suggestions (see Table 2 below).

When an enhanced buffered reader has a BufferFillSizeSelector, the buffered reader calls the method getBufferFillSize( ) when an input buffer fill is needed, to determine the number of input buffer elements, such as, for example, bytes or characters, to read and store from data 26 in the input buffer. Of course, the buffered reader may not be able to buffer the full size suggested by getBufferFillSize( ) due to limit cases near end of data.

Table 2 below summarizes the possible return values of getBufferFillSize( ) In Table 2, variable n represents the number of input buffer elements (e.g., characters or bytes) returned by function getBufferFillSize( ) and the variable s represents the size in input buffer elements of the input buffer:

TABLE 2

| Return Value of getNumBytesToBuffer( ) | Comments; Action Taken by Enhanced Buffered Reader |
|---|---|
| n > s | This is an illegal return value; A valid implementation of BufferFillSizeSelector should not return this. |
| 1 <= n <= s | Try to fill exactly n elements of the input buffer. |
| n < 1 | n is too small to be interpreted in the usual way. Instead, this is interpreted as a signal value indicating that the BufferFillSizeSelector has no more suggestions and triggers automatic disassociation of the BufferFillSizeSelector from the buffered reader |

A BufferFillSizeSelector implements method getBufferFillSize( ) based on a predetermined buffer fill size strategy. As shown in Table 3 below, a predetermined buffer fill size strategy is described as an ordered sequence of stages, where each stage consists of (1) a fill size in input buffer elements, such as, for example, bytes or characters and (2) the number of times to use the fill size. In the present example, as will typically be the case, we assume that the fill size decreases as the stage increases—for example, fill size A could be 10 megs, where 1 meg=1024*1024 input buffer elements, fill size B could be 1 meg, and fill size C of size 4 k, where k=1024 input buffer elements.

TABLE 3

| Stage | Fill Size (Decreasing) | Number of Times to Use |
|---|---|---|
| 1 | Fill size A | Use at most N1 times |
| 2 | Fill size B | Use at most N2 times |
| 3 | Fill size C | Repeat as necessary |

FIG. 2 shows that a BufferFillSizeSelector has an ordered collection of BufferFillSizeOverride objects. Each BufferFillSizeOverride (e.g., BufferFillSizeOverride 28) corresponds with a stage of a predetermined buffer fill size strategy. Each BufferFillSizeOverride has a fill size and a number of times to use. Thus, a sequence of BufferFillSizeOverride objects is one example of a predetermined buffer fill size strategy.

A BufferFillSizeSelector has two state variables in this example: bufferFillSizeOverrides and currentOverrideNdx. bufferFillSizeOverrides is a sequence of BufferFillSizeOverride objects, and currentOverrideNdx is a 0-based index into this sequence such that 0 refers to the first BufferFillSizeOverride, 1 refers to the next BufferFillSizeOverride, etc. The current BufferFillSizeOverride is the one referred to by currentOverrideNdx. The current BufferFillSizeOverride is the basis for the next return value from method getBufferFillSize( ).

On construction of a BufferFillSizeSelector, bufferFillSizeOverrides is set to a sequence of BufferFillSizeOverride objects in which each individual BufferFillSizeOverride object has valid values for fillSize and numTimesToUse. A fillSize is valid if it is in the inclusive range 1 through s where is the size in input buffer elements of the buffered reader's input buffer. The numTimesToUse is valid if it is any positive number. To indicate "Repeat as necessary," set numTimesToUse to the largest integer value a computer can represent, MAX_INT.

On construction of the BufferFillSizeSelector, currentOverrideNdx is set to 0, which makes the first BufferFillSizeOverride current.

An example of pseudo code for the method getBufferFillSize( ) is shown below and summarized here. If there is no current BufferFillSizeOverride object, i.e. the whole sequence of BufferFillSizeOverride objects has been used up, then return −1 to signal "no more suggestions", as specified in Table 2. If there is a current BufferFillSizeOverride, then set currentOverride to the current BufferFillSizeOverride based on currentOverrideNdx. Next, set fillSizeToReturn to the fillSize of currentOverride. Next, if the currentOverride's numTimesToUse is not MAX_INT, then it should not be used indefinitely and so the sequence of bufferFillSizeOverrides must be maintained, as follows: decrement currentOverride's numTimesToUse and, if this becomes 0, then increment the currentOverrideNdx to make the next BufferFillSizeOverride, if any, current, to set up for the next call to getBufferFillSize( ) Finally, return the fillSizeToReturn.

| BufferFillSizeSelector |
|---|
| // Array of BufferFillSizeOverride objects<br>BufferFillSizeOverride[ ] bufferFillSizeOverrides;<br>// Current index into the array<br>int currentOverrideNdx = 0; // 0 = the first index into bufferFillSizeOverrides<br>/**<br> * Return the next configured BufferFillSize<br> */<br>int getBufferFillSize( ) { |

-continued

BufferFillSizeSelector

```
if (currentOverrideNdx >= bufferFillSizeOverrides.length) {
    // There are no more predetermined BufferFillSizeOverrides to use
    return −1;
}
// Get the fill size from the current BufferFillSizeOverride
BufferFillSizeOverride currentOverride =
bufferFillSizeOverrides[currentOverrideNdx];
int fillSizeToReturn = currentOverride.getFillSize( );
if (currentOverride.getNumTimesToUse( ) <> MAX_INT) {
    // Decrement the "num times to use" of currentOverride and increment
    // currentOverrideNdx if the "num times to use" of currentOverride
```

-continued

BufferFillSizeSelector

```
    is zero
    if (currentOverride.decrementNumTimesToUse( ) == 0) {
        // Advance to the next BufferFillSizeOverride
        currentOverrideNdx = currentOverrideNdx + 1;
    }
}
return fillSizeToReturn;
}
```

BufferFillSizeOverride

```
int fillSize;
int numTimesToUse;
int getFillSize( ) {
    return fillSize
}
int decrementNumTimesToUse( ) {
    numTimesToUse = numTimesToUse − 1;
    return numTimesToUse;
}
```

Figure 3:
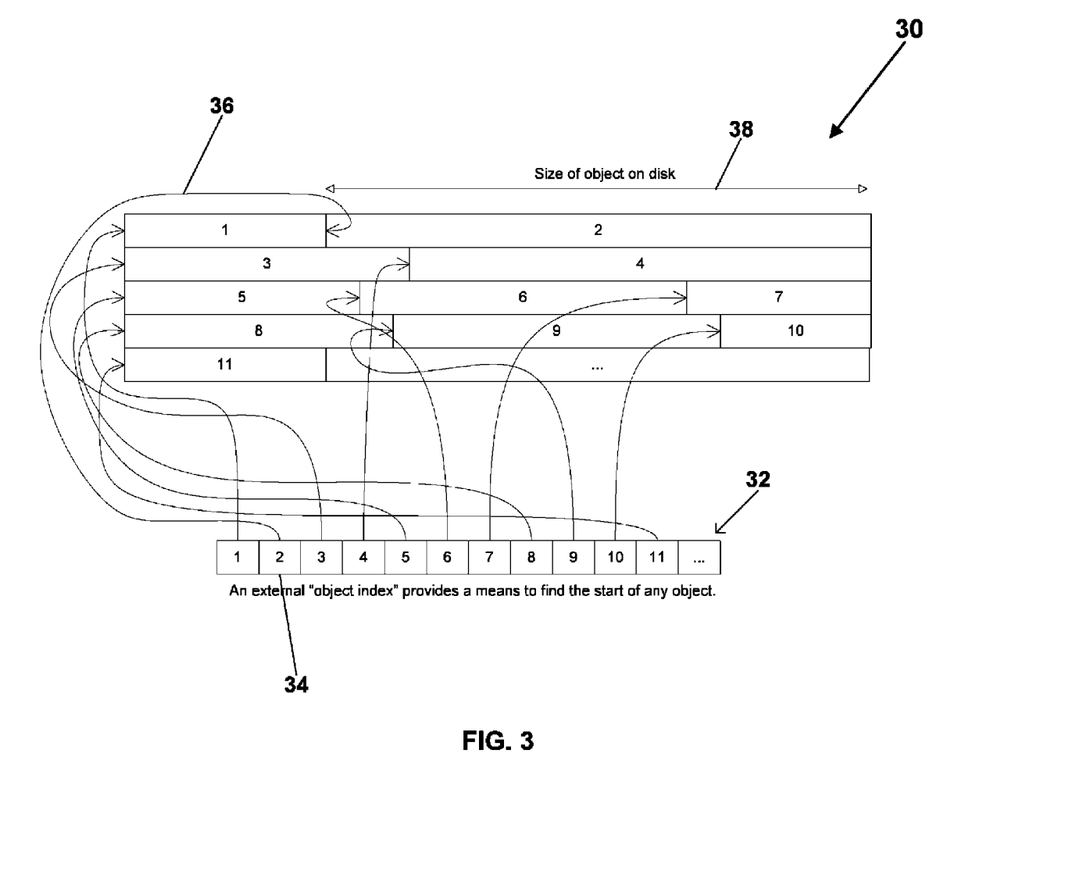
FIG. 3 is a visual representation of serialized objects as they might be stored on disk, where different objects require different amounts of disk storage.

An example of using an enhanced buffered reader will now be described with reference to FIGS. 3-5. In this example, an application needs efficient random access to serialized objects on disk. As depicted in FIG. 3, the objects 30 vary in size, and the application has an index 32 giving the start location and perhaps also the size in bytes of each object. Each object comprises numerous small attributes. For example, each object might represent a postings list in a search system, or any other kind of object comprising numerous small attributes. For example, the external object index 34 for item 2 includes a start location 36 and optionally a size 38.

Figure 4:
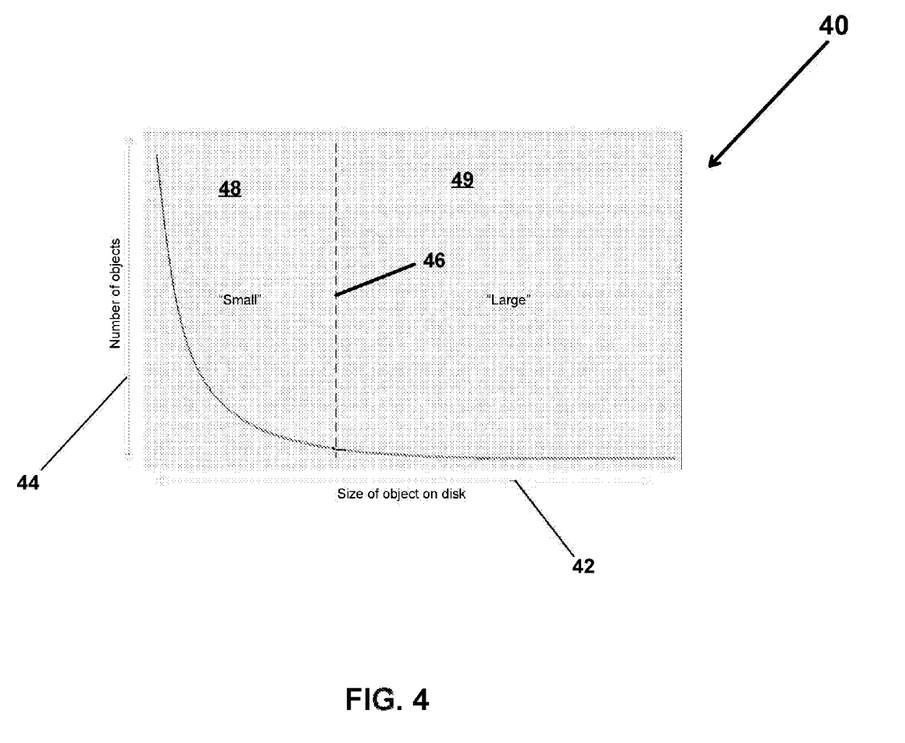
FIG. 4 is a graph of the distribution of the sizes of sample serialized objects, with sizes categorized as "large" or "small"

FIG. 4 is a graph 40 showing a distribution of sizes 42 of the serialized objects 44 in the example. The dashed line 46 in FIG. 4 represents a configured size limit, and the application considers all objects less than or equal than this limit to be "small" 48 and all objects greater than this limit to be "large" 49. A consideration in choosing this limit is that a "small" object preferably fits entirely within the enhanced buffered reader's input buffer.

The application uses different predetermined buffer fill size strategies with an enhanced buffered reader to read small and large objects with reference to Table 4. A discussion of one example of how the sample application creates strategies follows.

TABLE 4

| Strategy Name | Stage | Fill Size | Number of Time to Use |
|---|---|---|---|
| "Small Exact" | 1 | N | One |
| Given an object of known size N, where N <= Input Buffer Size | | | |
| "Small Approximate" | 1 | 4k | Repeat as necessary |
| Given an object of approximate size N, where N <= Input Buffer size | | | |
| "Large Exact" | 1 | Input Buffer size | N/Input Buffer size |
| | 2 | N mod Input Buffer size | One |
| Given an object of known size N, where N > Input Buffer size | | | |
| "Large Approximate" | 1 | Input Buffer size | N/Input Buffer size |
| | 2 | N mod Input Buffer size | One |
| | 3 | 4k | Repeat as necessary |
| Given an object of approximate size N, where N > Input Buffer size | | | |

The "Small Exact" strategy is for the case when an object is small, i.e. fits entirely within the enhanced buffered reader's input buffer in this example, and its size is precisely known before it is read. The application gets the object's size somehow, for example, from metadata in the object index or by subtracting the offsets in adjacent index entries, and creates a very simple single-stage strategy to fill the buffer one time using the precise size of the object. This strategy allows the object to be read using one read system call and with minimal data transfer overhead.

The "Small Approximate" strategy is for the case when an object is probably small but its size is not precisely known before it is read. For example, the application may know based on the overall size distribution of objects in a given file, that most of the objects are small, and the application does not want to bother with managing separate read strategies for different objects. In this case, the application could set up a Small Approximate strategy as a very simple single-stage strategy that uses a small constant buffer size such as 4 kilobytes (4K) indefinitely. While the enhanced buffered reader has an input buffer that is substantially larger than 4K, only 4K of its buffer will be used. This strategy is most appropriate for small objects that are on the order of several kilobytes: In this situation, the strategy results in a small number of system calls and only a small amount of extra (wasted) data transfer.

The "Large Exact" strategy is for the case when an object is large, i.e. does not fit entirely within the enhanced buffered reader's input buffer in this example, and its size is precisely known before it is read. The application gets the object's size somehow, for example, from metadata in the object index or by subtracting the offsets in adjacent index entries. Let N be the size of the object being read, let be the size of the enhanced buffered reader's input buffer, and let DIV and MOD represent the operations of integer division and modulus, respectively. The application creates a two stage strategy as follows: (1) Completely fill the input buffer (N DIV s) times and (2) fill the input buffer to size (N mod s) one time. Given the size of the enhanced buffered reader's input buffer, this strategy uses the minimum number of read system calls possible to read the exact data required.

"The Large Approximate" strategy is for the case when an object is large, i.e. does not fit entirely within the enhanced buffered reader's input buffer in this example, and its size is only approximately known before it is read. For this situation, using a strategy similar to Large Exact, but with a third stage that does as many additional supplemental reads as needed (e.g., in amounts of 4 k bytes), can be effective.

Figure 5:
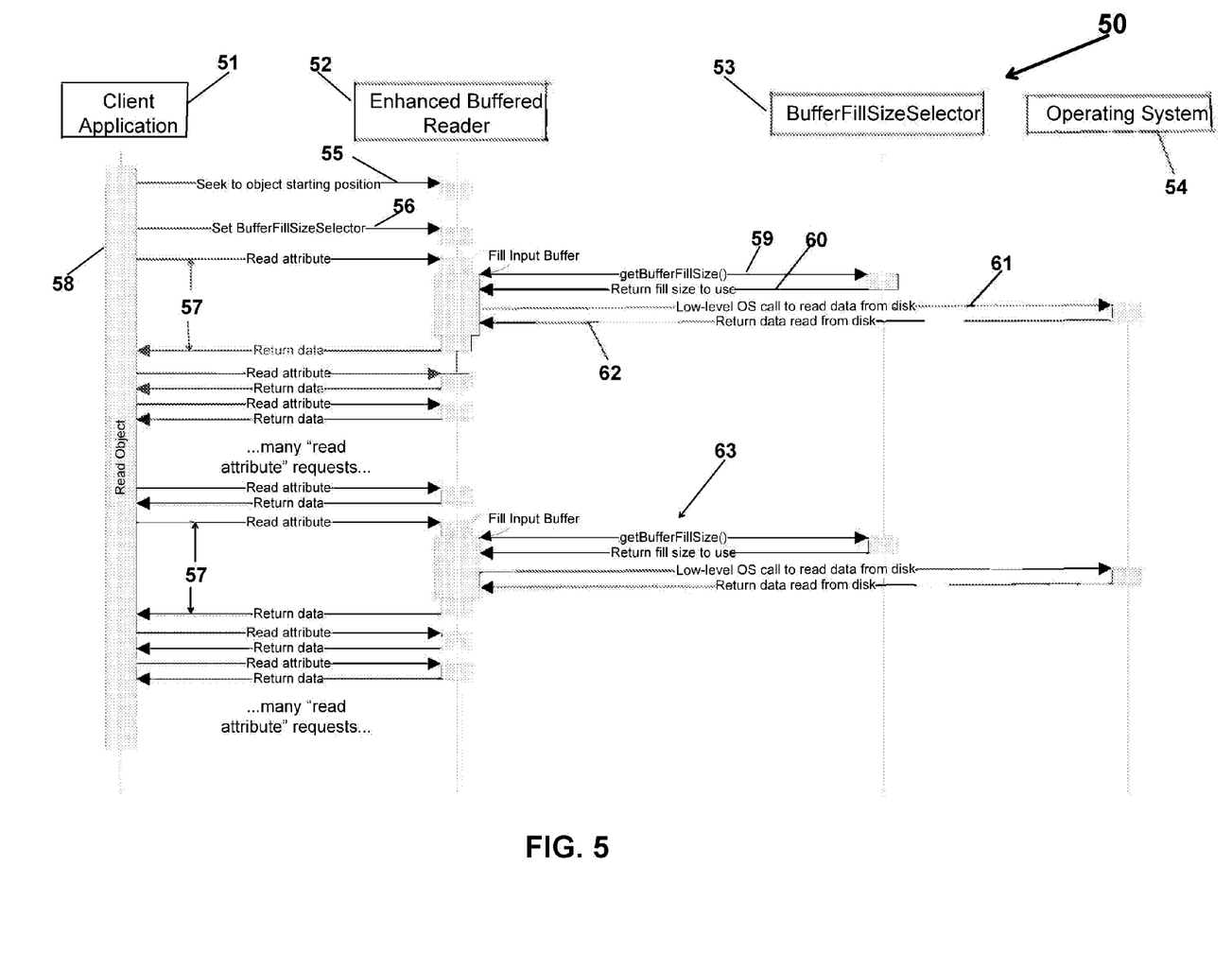
FIG. 5 is a sequence diagram depicting the process of deserializing an object from a file using an enhanced buffered reader.

The sequence diagram 50 in FIG. 5 shows interactions between a client application 51, enhanced buffered reader 52, BufferFillSizeSelector 53 and operating system 54 as the client application is deserializing a large object 58 using the enhanced buffered reader. First, the client application, using an object index, determines the starting location of the object to read. This location is passed to the enhanced buffered reader via a seek call 55. Next, the client application creates a predetermined buffer fill size strategy such as one of the ones described with respect to Table 4. This strategy is installed by calling a setter on the enhanced buffered reader 56. Finally, from the application's point of view, the only remaining step is to repeatedly call read methods on the enhanced buffered reader to deserialize the object 57.

As shown in FIG. 5, the enhanced buffered reader takes care of buffering details automatically. When the buffered reader gets the first read request from the client application (i.e., first "read attribute"), it recognizes that its internal input buffer is empty and that a buffer fill is needed. The buffered reader then calls getBufferFillSize( ) 59 on the BufferFillSizeSelector 53 to obtain the next fill size 60. The buffered reader than makes a read system call 61 to obtain, from the operating system 54, fill size input buffer elements. This data is stored in the buffered reader's internal input buffer 62. Part of this data is then returned to the client application 57, to satisfy the client's current read request. The rest of the data in the buffered reader's internal input buffer is available to satisfy future read requests. The buffered reader continues to satisfy client application read requests from its input buffer, periodically and automatically refilling the input buffer as needed according to the predetermined buffer fill size strategy 63.

A conventional buffered reader usually fills its entire input buffer when a buffer fill is needed. Some conventional buffered readers also support doing large reads directly to a client's input buffer, bypassing the conventional buffered reader's internal buffering mechanism, but this breaks encapsulation of both buffering and of access to the underlying data. An enhanced buffered reader, by having a predetermined buffer fill size strategy, has the ability to vary the size of its internal buffering operations appropriate to the size of the objects being read, which is good for runtime efficiency, while at the same time maintaining encapsulation.

The shortcomings of the prior art are overcome and additional advantages are provided through the provision of a computer program product for buffered reading of data. The computer program product comprises a storage medium readable by a processing circuit and storing instructions for execution by a computer for performing a method. The method includes, for instance, receiving a read request for data by a buffered reader, and in response to the read request, partially filling a main memory input buffer with the data by the buffered reader to a predetermined amount that is less than a fill capacity of the input buffer.

Methods and systems relating to one or more aspects of the present invention are also described and claimed herein. Additional features and advantages are realized through the techniques of the present invention. Other embodiments and aspects of the invention are described in detail herein and are considered a part of the claimed invention.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

As will be appreciated by one skilled in the art, aspects of the present invention may be embodied as a method, system or computer program product. Accordingly, aspects of the present invention may take the form of an entirely hardware embodiment or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any physical medium that can contain or store a program for use by or in connection with an instruction execution system, apparatus, or device.

In one example, a computer program product includes, for instance, one or more computer readable media to store computer readable program code means or logic thereon to provide and facilitate one or more aspects of the present invention. The computer program product can take many different physical forms, for example, disks, platters, flash memory, etc.

Program code embodied on a computer readable medium may be transmitted using an appropriate medium, including but not limited to optical, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including, for example, a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system may be provided suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

The invention claimed is:

1. A method of buffered reading of data, the method comprising:
   receiving a read request from a requestor for data by a buffered reader within a data processing system;
   in response to the read request, obtaining a predetermined value for an amount of the data to be read and placed in a memory buffer;
   reading by the buffered reader the amount of the data indicated by the predetermined value;
   placing by the buffered reader the data read into the memory buffer; and
   returning the data placed in the memory buffer to the requestor;
   wherein the read request is for a posting list when searching an inverted index for a search term, and wherein the posting list is associated with the search term.

2. The method of claim 1, further comprising repeating the obtaining a predetermined number of times, wherein the predetermined number of times is more than zero up to infinity.

3. The method of claim 2, wherein the method is performed for a sequence of pairs of the predetermined amount and a predetermined number of times, wherein the predetermined number of times is more than zero up to infinity.

4. The method of claim 1, wherein the amount of data is less than a fill capacity of the memory buffer.

5. The method of claim 1, wherein the predetermined amount comprises a number of characters.

6. The method of claim 1, wherein the predetermined amount comprises a number of bytes.

7. The method of claim 1, wherein the obtaining comprises calling by the buffered reader an object that returns the predetermined value.

8. The method of claim 7, further comprising disassociating the object from the buffered reader.

9. A method of buffered reading of data, the method comprising:
   receiving a read request from a requestor for data by a buffered reader within a data processing system;
   in response to the read request, obtaining a predetermined value for an amount of the data to be read and placed in a memory buffer, wherein the obtaining comprises calling by the buffered reader an object that returns the predetermined value;
   reading by the buffered reader the amount of the data indicated by the predetermined value;
   placing by the buffered reader the data read into the memory buffer;
   returning the data placed in the memory buffer to the requestor;
   wherein the read request is for a posting list when searching an inverted index for a search term, and wherein the posting list is associated with the search term; and
   disassociating the object from the buffered reader, wherein the disassociating comprises automatically disassociating the object from the buffered reader if the predetermined amount returned by the object is invalid.

10. The method of claim 1, wherein the read request comprises a read size, and wherein if the read size is larger than the fill capacity of the memory buffer, then the reading, placing and returning are performed for the fill capacity a whole number of times equal to the read size divided by the fill capacity, and then performed for less than the fill capacity.

11. The method of claim 10, wherein if data for the read request remains, then the reading, placing and returning are performed for a predetermined supplemental amount until the additional data has been read.

12. The method of claim 11, wherein the predetermined supplemental amount is different from the predetermined amount.

13. The method of claim 12, wherein the predetermined supplemental amount is less than the predetermined amount.

14. A computer system for buffered reading of data, comprising:
   a memory; and
   a processor in communication with the memory to perform a method, the method comprising:
      receiving a read request from a requestor for data by a buffered reader;
      in response to the read request, obtaining a predetermined value for an amount of the data to be read and placed in a memory buffer;
      reading by the buffered reader the amount of the data indicated by the predetermined value;
      placing by the buffered reader the data read into the memory buffer; and
      returning the data placed in the memory buffer to the requestor;
      wherein the read request is for a posting list when searching an inverted index for a search term, and wherein the posting list is associated with the search term.

15. The system of claim 14, further comprising repeating the obtaining a predetermined number of times, wherein the predetermined number of times is more than zero up to infinity.

16. The system of claim 15, wherein the method is performed for a sequence of pairs of the predetermined amount and a predetermined number of times, wherein the predetermined number of times is more than zero up to infinity.

17. The system of claim 14, wherein the amount of data is less than a fill capacity of the memory buffer.

18. The system of claim 14, wherein the predetermined amount comprises a number of characters.

19. The system of claim 14, wherein the predetermined amount comprises a number of bytes.

20. The system of claim 14, wherein the obtaining comprises calling by the buffered reader an object that returns the predetermined value.

21. The system of claim 20, further comprising disassociating the object from the buffered reader.

22. A computer system for buffered reading of data, comprising:
   a memory; and
   a processor in communication with the memory to perform a method, the method comprising:
      receiving a read request from a requestor for data by a buffered reader within a data processing system;
      in response to the read request, obtaining a predetermined value for an amount of the data to be read and placed in a memory buffer, wherein the obtaining comprises calling by the buffered reader an object that returns the predetermined value
      reading by the buffered reader the amount of the data indicated by the predetermined value;
      placing by the buffered reader the data read into the memory buffer;
      returning the data placed in the memory buffer to the requestor;
      disassociating the object from the buffered reader;
      wherein the read request is for a posting list when searching an inverted index for a search term, and wherein the posting list is associated with the search term; and
      disassociating the object from the buffered reader, wherein the disassociating comprises automatically disassociating the object from the buffered reader if the predetermined amount returned by the object is invalid.

23. The system of claim 14, wherein the read request comprises a read size, and wherein if the read size is larger than the fill capacity of the memory buffer, then the reading, placing and returning are performed for the fill capacity a whole number of times equal to that read size divided by the fill capacity of, and then performed for less than the fill capacity.

24. The system of claim 14, wherein if additional data for the read request remains, then the reading, placing and returning are performed for a predetermined supplemental amount until the additional data has been read.

25. The system of claim 24, wherein the predetermined supplemental amount is different from the predetermined amount.

26. The system of claim 25, wherein the predetermined supplemental amount is less than the predetermined amount.

27. A program product for buffered reading of data, the program product comprising:
a physical storage medium readable by a processor and storing instructions for execution by the processor for performing a method, the method comprising:
receiving a read request from a requestor for data by a buffered reader; and
in response to the read request, obtaining a predetermined value for an amount of the data to be read and placed in a memory buffer;
reading by the buffered reader the amount of the data indicated by the predetermined value;
placing by the buffered reader the data read into the memory buffer; and
returning the data placed in the memory buffer to the requestor;
wherein the read request is for a posting list when searching an inverted index for a search term, and wherein the posting list is associated with the search term.

28. The program product of claim 27, further comprising repeating the obtaining a predetermined number of times, wherein the predetermined number of times is more than zero up to infinity.

29. The program product of claim 28, wherein the method is performed for a sequence of pairs of the predetermined amount and a predetermined number of times, wherein the predetermined number of times is more than zero up to infinity.

30. The program product of claim 27, wherein the amount of data is less than a fill capacity of the memory buffer.

31. The program product of claim 27, wherein the predetermined amount comprises a number of characters.

32. The program product of claim 27, wherein the predetermined amount comprises a number of bytes.

33. The program product of claim 27, wherein the obtaining comprises calling by the buffered reader an object that returns the predetermined value.

34. The program product of claim 33, further comprising disassociating the object from the buffered reader.

35. A program product for buffered reading of data, the program product comprising:
a physical storage medium readable by a processor and storing instructions for execution by the processor for performing a method, the method comprising:
receiving a read request from a requestor for data by a buffered reader within a data processing system;
in response to the read request, obtaining a predetermined value for an amount of the data to be read and placed in a memory buffer, wherein the obtaining comprises calling by the buffered reader an object that returns the predetermined value;
reading by the buffered reader the amount of the data indicated by the predetermined value;
placing by the buffered reader the data read into the memory buffer;
returning the data placed in the memory buffer to the requestor;
wherein the read request is for a posting list when searching an inverted index for a search term, and wherein the posting list is associated with the search term;
wherein the obtaining comprises calling by the buffered reader an object that returns the predetermined value; and
disassociating the object from the buffered reader, wherein the disassociating comprises automatically disassociating the object from the buffered reader if the predetermined amount returned by the object invalid.

36. The program product of claim 27, wherein the read request comprises a read size, and wherein if the read size is larger than the fill capacity of the memory buffer, then the reading, placing and returning are performed for the fill capacity a whole number of times equal to that read size divided by the fill capacity, and then performed for less than the fill capacity.

37. The program product of claim 27, wherein if additional data for the read request remains, then the reading, placing and returning are performed for a predetermined supplemental amount until the additional data has been read.

38. The program product of claim 37, wherein the predetermined supplemental amount is different from the predetermined amount.

39. The program product of claim 38, wherein the predetermined supplemental amount is less than the predetermined amount.

* * * * *